United States Patent [19]

Fujii

[11] Patent Number: 4,879,565

[45] Date of Patent: Nov. 7, 1989

[54] INK JET PRINTER

[75] Inventor: Katsuyuki Fujii, Azuchi, Japan

[73] Assignee: Minolta Camera Kabushiki Kaisha, Osaka, Japan

[21] Appl. No.: 303,760

[22] Filed: Jan. 27, 1989

[30] Foreign Application Priority Data

Jan. 27, 1988 [JP] Japan .................................. 63-14590

[51] Int. Cl.⁴ ............................................. G01D 18/00

[52] U.S. Cl. ........................................................ 346/75

[58] Field of Search ........................................... 346/75

[56] References Cited

U.S. PATENT DOCUMENTS 4,394,663 7/1983 Ameyama ............................. 346/75
4,673,951 6/1987 Mutoh et al. ......................... 346/75

FOREIGN PATENT DOCUMENTS 56-144978 11/1981 Japan .................................... 346/75
56-162665 12/1981 Japan .................................... 346/75

*Primary Examiner*—H. Broome
*Assistant Examiner*—Gerald E. Preston
*Attorney, Agent, or Firm*—Price, Gess & Ubell

[57] ABSTRACT

An ink jet printer comprising a device for adjusting a relative position between a nozzle for jetting out ink and a block member for capturing those of ink droplets in flight which are not used for recording. The ink droplets jetting out of the nozzle are deflected by a smaller amount during a relative position adjustment than during a recording operation.

14 Claims, 5 Drawing Sheets

INK JET PRINTER

FIELD OF THE INVENTION

The present invention relates to ink jet printers, and more particularly to an ink jet printer comprising a device for adjusting a relative position between a nozzle for jetting out ink and a block member for capturing those ink droplets in flight which are not used for recording.

DESCRIPTION OF THE PRIOR ART

A Hertz type ink jet printer is disclosed in U.S. Pat. No. 4,673,951. This ink jet printer comprises a head 5 as shown in FIG. 1. A nozzle **5*a* is connected through a pump 9 to an ink bottle 8 for continuously jetting out ink. A charge electrode 5*b* is housed in the nozzle 5*a*, and a ground electrode 5*c* is disposed immediately forwardly of the nozzle 5*a* for forming an electric field between the charge electrode 5*b* and ground electrode 5*c*. The ink is jetted out of the nozzle 5*a* in droplets as selectively charged by these electrodes 5*b* and 5*c*. A drum 2 is disposed forwardly of the nozzle 5*a* for supporting recording paper P. A deflection electrode 5*d* and a ground electrode 5*e* are disposed between the nozzle 5*a* and drum 2 for forming an electric field intersecting a direction of ink flight at right angles. Charged ink droplets are deflected toward the ground electrode 5*a* by the electric field formed by these electrodes 5*d* and 5*e*. A block member 5*f* is mounted on the ground electrode 5*e*** for capturing and collecting the deflected ink droplets.

In the above construction, the charged ink droplets are deflected and collected whereas uncharged ink droplets proceed straight through the electric field to reach the recording paper P. Accordingly, an image may be recorded on the paper P by controlling charging/non-charging of the ink in response to image information.

With this type of ink jet printer, it is necessary to effect accurate adjustment as to the relative position between a trajectory of ink droplets and the block member at the time of product shipment, periodic maintenance or head changing.

One method of such adjustment is disclosed in Japanese Patent Publication Kokai No. 56-144978. According to this method, the block member is set in position and then a marked target is placed in the trajectory of ink droplets jetting out of the nozzle. The head is adjusted to a proper position in which the ink droplets accurately hit the mark.

With the known adjustment of the jetting direction in the ink jet printer, excessive ink mist is produced and the head and adjacent components become blotted with the ink during an adjusting operation since the ink droplets are constantly hitting the target. In extreme cases, the ink mist would enter electric circuits and the like during the adjustment operation, thereby deteriorating electric characteristics. The adjustment must, therefore, be followed by a cleaning step, which results in an increase in the number of operations. The ink mist could even intrude into parts of the printer which are impossible to clean without disassembly.

The above method of adjustment is not very reliable since it relies on visual judgment as to whether the ink droplets are hitting the mark on the target or not. This method has further disadvantages of requiring skill and complicated operations in that the positional adjustment of the head must be effected with respect to a minute range.

Moreover, this adjustment is carried out on the condition that the block member is correctly set in position. An error in the block member setting would result in the problem of impairing the quality of recorded images.

SUMMARY OF THE INVENTION

A primary object of the present invention, therefore, is to provide improved means for effecting accurate adjustment of the relative position between the trajectory of ink droplets and the block member.

Another object of the present invention is to provide means for enabling adjustment of the relative position between the trajectory of ink droplets and the block member without placing a marked target in the trajectory of ink droplets.

A further object of the invention is to provide means for effecting a highly reliable adjustment of the relative position through a simple operation.

These objects are fulfilled, according to the present invention, by an ink jet printer comprising means for jetting out ink droplets; means for selectively charging the ink droplets; means for forming an electric field to deflect charged ink droplets; means for capturing the charged ink droplets deflected by the electric field, thereby preventing the charged ink droplets from reaching recording paper and allowing uncharged ink droplets to reach the recording paper; means for adjusting a relative position between the ink jetting means and the ink capturing means; and means for controlling an amount of ink droplet deflection effected by the electric field, the control means being operable in a recording mode for carrying out recording on the recording paper and in an adjusting mode for adjusting the relative position between the ink jetting means and the ink capturing means, the amount of ink droplet deflection being smaller in the adjusting mode than in the recording mode.

The ink droplet charging means may be operable in a first mode for selectively charging the ink droplets in response to image information to be recorded and in a second mode for charging all the ink droplets jetting out in succession.

Further, the control means may be operable for causing the charging means to charge the ink droplets in the adjusting mode with half a potential for the recording mode.

Alternatively, the control means may be operable to render the electric field in the adjusting mode half of the electric field in the recording mode.

The adjusting means may be operable to move the ink jetting means in a direction of ink droplet deflection.

In a different embodiment, the adjusting means is operable to move the ink capturing means in a direction of ink droplet deflection.

In the construction according to the present invention, the relative position between the ink jetting means and the ink capturing means is adjusted by running the ink jet printer in the adjusting mode, and operating the adjusting means for causing the ink capturing means to move to a critical position to capture charged ink droplets jetting out in succession. The amount of ink droplet deflection is smaller in this adjusting mode than the recording mode. Therefore, once an adjustment is effected such that the charged droplets are captured by the ink capturing means in this state, the charged droplets are positively captured in the recording mode following the adjustment even if there should be variations in the electric charge of the ink droplets.

Uncharged droplets, on the other hand, will reach the recording paper without fail. Consequently, the printer according to the present invention assures high quality recorded images free of blotting.

In addition, the above position adjustment eliminates the possibility of the quality of recorded images being impaired even if a slight change should occur after the adjustment in the relative position between the ink jetting means and the ink capturing means.

BRIEF DESCRIPTION OF THE DRAWINGS

These and other objects, advantages and features of the present invention will become apparent from the following description thereof taken in conjunction with the accompanying drawings, in which.

DETAILED DESCRIPTION OF THE PREFERRED EMBODIMENTS

Embodiments of the present invention will be described in detail hereinafter with reference to FIGS. 2 through 5.

Figure 1:
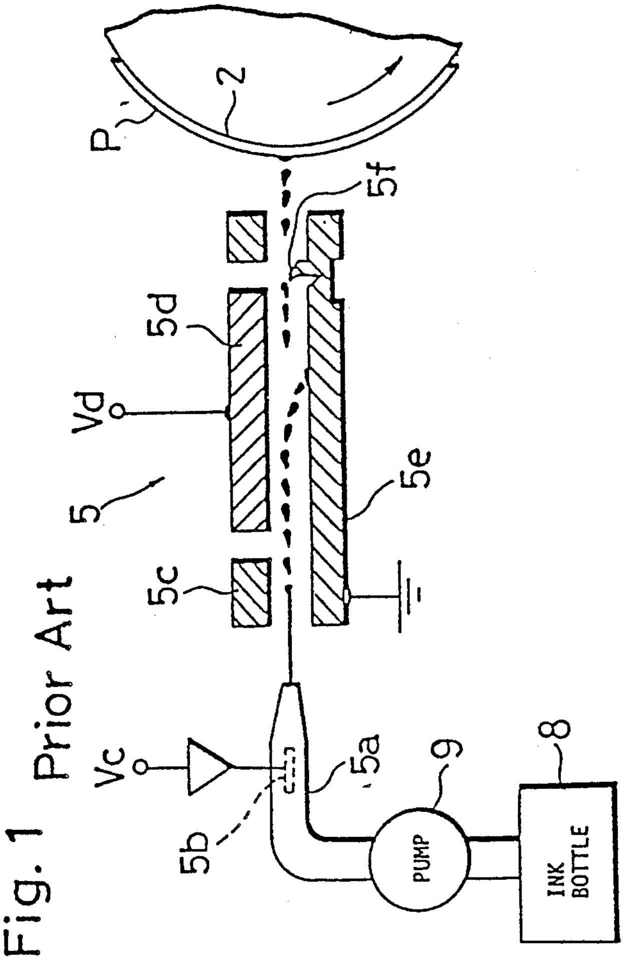
Fig. 1 Prior Art
FIG. 1 is a view illustrating the basic construction of a conventional ink jet printer.
Figure 2:
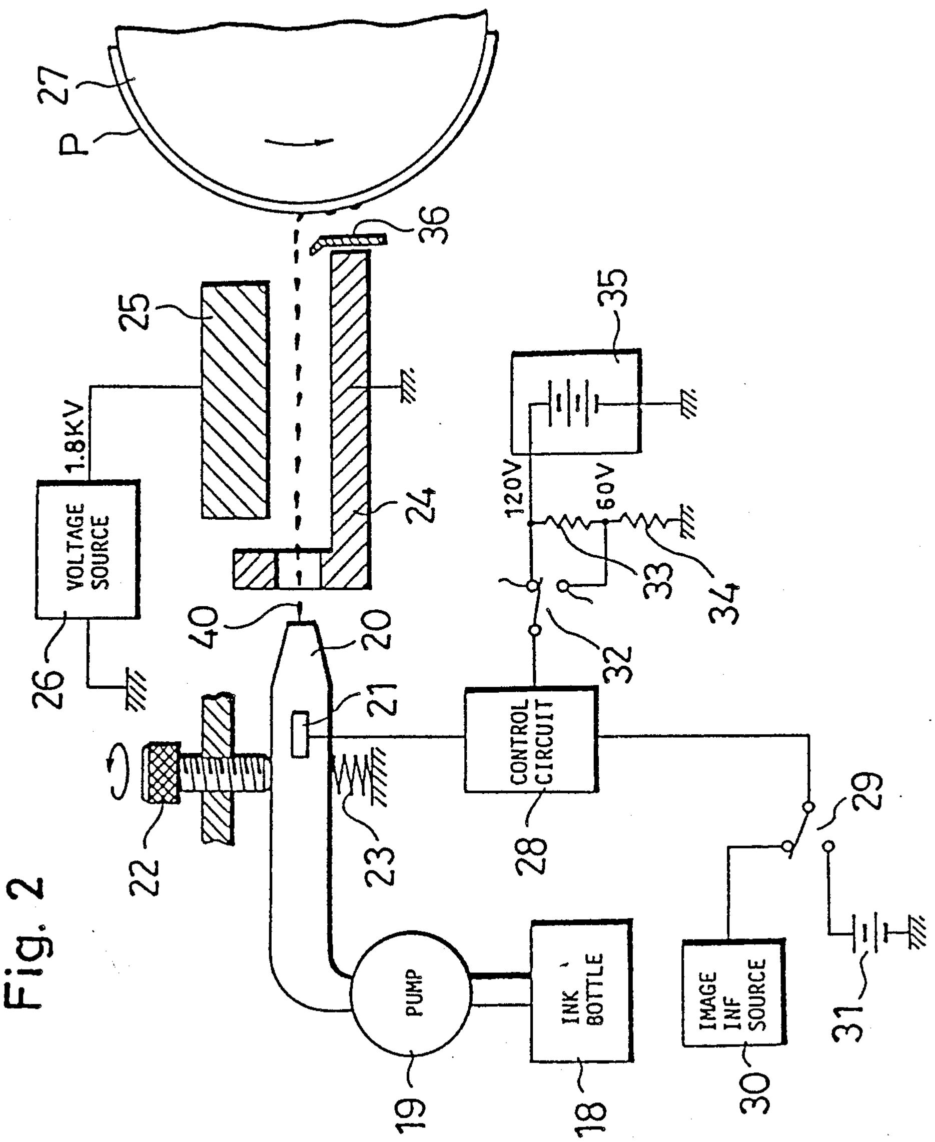
FIG. 2 is a view illustrating the basic construction of an ink jet printer according to a first embodiment of the present invention.
Figure 3:
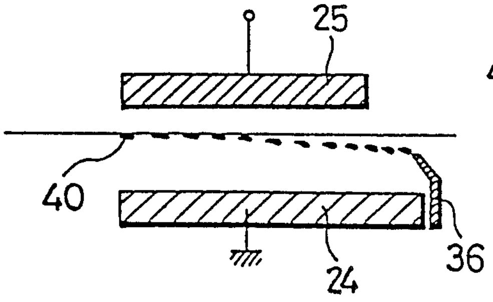
FIGS. 3 and 4 are views illustrating an adjusting operation of the printer shown in FIG. 2.

A first embodiment of the invention will be described first with reference to FIG. 2 through 4. The illustrated ink jet printer comprises a nozzle 20 connected to an ink pump 19 communicating with an ink bottle 18. A drum 27 for supporting recording paper P as wound thereon is disposed forwardly of a trajectory of ink 40 jetting out of the nozzle 20.

The nozzle 20 houses a charge electrode 21 for charging the ink 40. A deflection electrode 25 is disposed between the nozzle 20 and drum 27 for forming a deflection electric field intersecting a direction of trajectory of the ink 40 at right angles. A ground electrode 24 is disposed opposite the deflection electrode 25. This ground electrode 24 is bent to an L shape immediately forwardly of the nozzle 20 to act also as an electrode opposed to the charge electrode 21. A block member 36 is disposed between the ground electrode 24 and the drum 27 for collecting charged ink droplets deflected by the deflecting electric field.

The nozzle 20 is provided with a position adjusting mechanism including an adjusting screw 22 and a spring 23 for vertically adjusting a nozzle position. The deflection electrode 25 has connected thereto an output end of a 1.8 kV deflection voltage source 26.

The charge electrode 21 is connected through a control circuit 28 to a first switch circuit 29. The switch circuit 29 is switchable to connect either an image information source 30 or a voltage source 31 to the control circuit 28. For normal image formation, the first switch circuit 29 is switched to connect the image information source 30 to the control circuit 28, whereby a signal corresponding to an image is transmitted from the image information source 30 to the control circuit 28. When the nozzle position is adjusted, the first switch circuit 29 is switched to connect the voltage source 31 to the control circuit 28. At this time, the voltage source 31 supplies a fixed signal voltage in the same level as a signal corresponding to a non-image portion, in order to constantly charge the ink.

The control circuit 28 is connected also to a second switch circuit 32. This switch circuit 32 is switchable to connect either an output terminal a of a 120 V power source 35 or a 60 V divided voltage output terminal b of a voltage divider circuit including resistors 33 and 34 having an equal resistance. Voltage of 120 V is supplied to the control circuit 28 during normal image formation, and a half voltage of 60 V during nozzle position adjustment. During the normal image formation, the control circuit 28 selectively applies the voltage of 120 V to the charge electrode 21 in response to the signal received from the image information source 30. During the nozzle position adjustment, the control circuit 28 constantly applies the voltage of 60 V to the charge electrode 21.

According to the above construction, the ink in the ink bottle 18 is supplied, during the normal image formation, through the ink pump 19 to the nozzle 20 where the ink is charged by the charge electrode 21 in response to the image signal. At this time the charge electrode 21 is selectively supplied with the voltage (120 V) from the power source 35 through the control circuit 28. That is, the ink is not charged when allowed to adhere to the paper P, and is charged when prevented from adhering to the paper P. Uncharged ink droplets proceed straight through the electric field between the deflection electrode 25 and ground electrode 24, whereas charged ink droplets are deflected by the electric field to be captured by the block member 36.

During the nozzle position adjustment, the first switch circuit 29 is switched to the voltage source 31 and the second switch 32 to the divided voltage output terminal b by an external control switch or the like not shown. As a result, the divided voltage (60 V) is constantly supplied to the charge electrode 21. Thus the amount of deflection of the charged ink droplet during the adjustment is half the amount of deflection during the normal image formation. While the charged ink droplets are continuously jetting out, the screw 22 is turned to adjust the nozzle 20 to a position for causing the ink droplets to be captured by a very tip end of the block member 36 as seen in FIG. 3.

Figure 4:
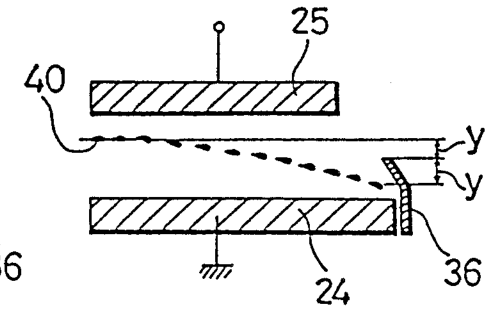

When the normal image formation is resumed by operating the external control switch or the like after the nozzle position adjustment, the charged ink droplets are deflected, as shown in FIG. 4, by twice the amount of deflection y during the nozzle position adjustment.

Consequently, the uncharged ink droplets positively reach the recording paper P, whereas the charged ink droplets are positively captured by the block member 36 even if some of the droplets should be somewhat less charged than others. This feature effectively prevents the charged droplets from reaching the recording paper P to cause image blotting, thereby to assure high quality image recording. The above position adjustment also eliminates the possibility of the quality of recorded images being affected by a slight nozzle displacement, if any, following the adjustment.

Visual observation is made during the position adjustment as to whether the ink droplets are captured by the block member 36 or not. This observation enables a reliable judgment since it is clearly seen that the ink droplets do not reach the recording paper P when captured by the block member 36 and reach the paper P when not.

A charge detector may be connected to the block member 36. Then, whether the ink droplets are hitting the block member 36 or not may readily be judged by monitoring the output of the charge detector.

Alternatively, a pair of a light source and a photosensor may be provided for enabling the above judgment, i.e. detecting ink droplets present therebetween.

Figure 5:
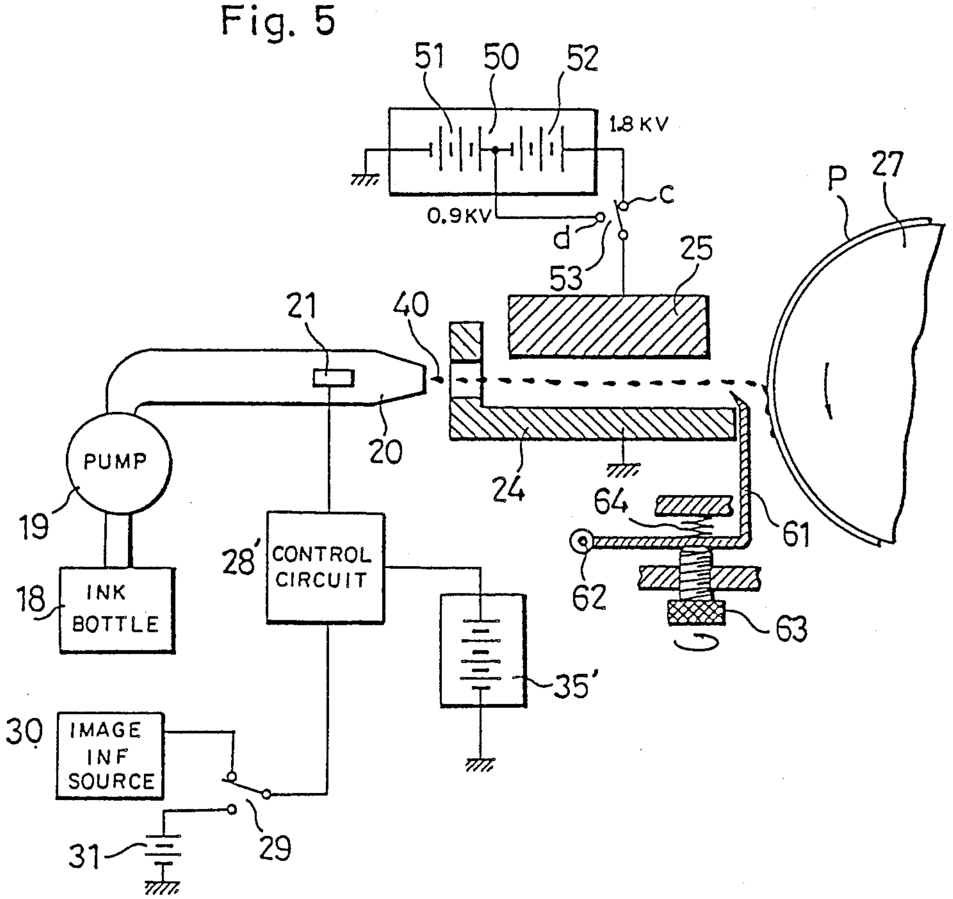
FIG. 5 is a view illustrating the basic construction of an ink jet printer according to a second embodiment of the present invention.

A second embodiment of the present invention will be described next with reference to FIG. 5. In the foregoing, first embodiment, the electric charge of ink is lowered during the position adjustment to reduce the amount of ink droplet deflection. In the second embodiment, the electric charge of ink is not varied but a reduced voltage is applied to the deflection electrode during the position adjustment, thereby to reduce the amount of ink droplet deflection.

More particularly, this embodiment includes a power source 35′ connected to a control circuit 28′ for outputting 120 V, and a switch circuit 53 connected to the deflection electrode 25. During the normal image formation, this switch circuit 53 is connected to one output terminal c of a deflection voltage source 50, i.e. a series output terminal c (1.8 kV) of power sources 51 and 52. During the position adjustment, the switch circuit 53 is connected to an output terminal d (0.9 kV) of the power source 51. Thus the switch circuit 53 is switchable to selectively apply the two voltages to the deflection electrode 25.

The second embodiment further includes an L-shaped block member 61 disposed forwardly of the ground electrode 24. The block member 61 is pivotably supported by a support axis 62, with a position adjusting mechanism including an adjusting screw 63 and a spring 64 attached to one arm of the L-shaped block member 61. A tip end of the block member 61 is vertically adjustable with respect to an axis of ink droplets 40 by turning the adjusting screw 63 against the urging force of spring 64.

In the second embodiment, as in the first embodiment, the voltage applied to the deflection electrode 25 during the adjustment is reduced to half the voltage applied during the normal image formation, thereby reducing the amount of charged ink droplet deflection during the adjustment to half the amount of deflection during the normal image formation. Then the block member 61 is moved to adjust the relative position between the nozzle 20 and block member 61.

Other means may be employed than the charge voltage variation as in the first embodiment and the deflection electric field variation as in the second embodiment, for reducing the amount of deflection of charged ink droplets for the position adjustment. For example, the deflection electric field may be halved during the position adjustment by doubling a distance between the ground electrode and the deflection electrode opposed thereto.

Instead of the nozzle and the block member which act as the positionally adjustable means in the first and second embodiments, the components for forming the deflection electric field may be adapted positionally adjustable in their entirety.

The jetting direction adjusting device for use in an ink jet printer according to the present invention is applicable not only to a monocolor printer but of course also to a multicolor printer and various other types of recording apparatus.

Figure 6:
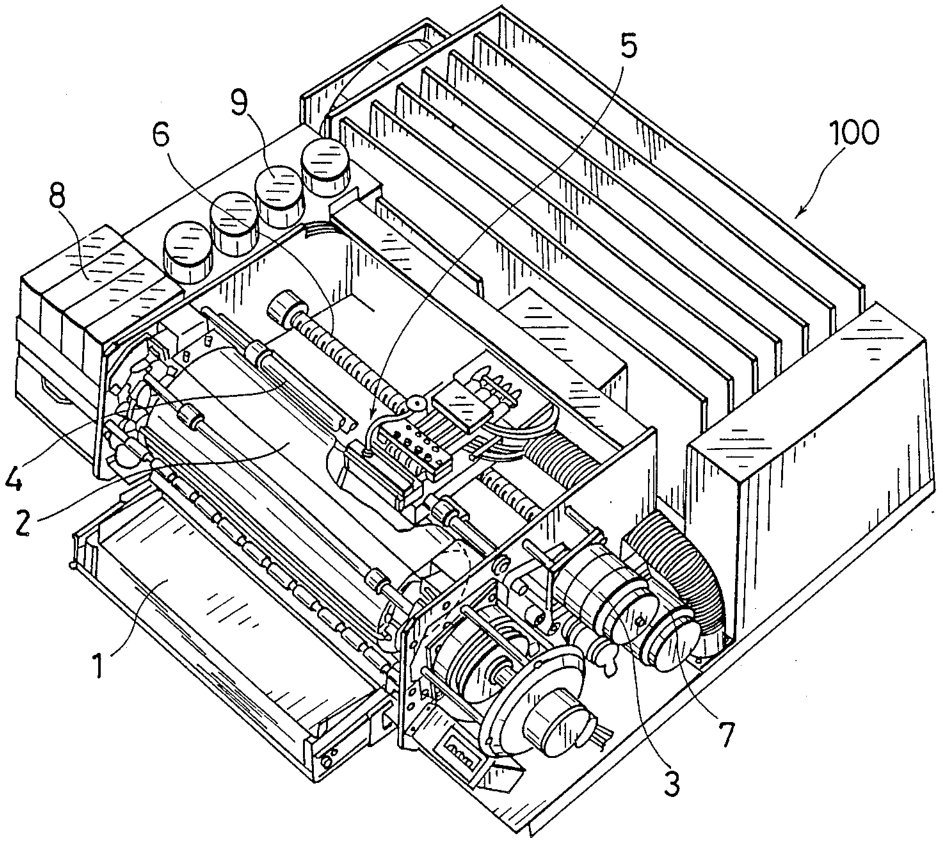
FIG. 6 is a perspective view of an ink jet printer to which the present invention is applicable.

FIG. 6 shows one example of ink jet printer to which the present invention is applicable. This ink jet printer 100 comprises a paper tray 1, a drum 2 on which paper supplied from the paper tray 1 is wound, a drum drive motor 3, and a carriage 5 movable along a guide shaft 4 extending axially of the drum 2. The carriage 5 supports four heads each having the construction described hereinbefore and provided for each of four colors, yellow, magenta, cyan and black. The carriage 5 is axially movable with rotation of a screw 6 caused by a stepping motor 7, and recording is carried out synchronously with the carriage movement.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An ink jet printer comprising:
means for jetting out ink droplets;
means for charging the ink droplets;
means for forming an electric field to deflect charged ink droplets;
means for capturing the charged ink droplets deflected by the electric field, thereby preventing the charged ink droplets from reaching recording paper and allowing uncharged ink droplets to reach the recording paper;
means for adjusting a relative position between said ink jetting means and said ink capturing means; and
means for controlling an amount of deflection of the charged ink droplet effected by said electric field, said control means being operable in a recording mode for carrying out recording on the recording paper and in an adjusting mode for adjusting the relative position between said ink jetting means and said ink capturing means, the amount of deflection of the charged ink droplet is set to be smaller in the adjusting mode than in the recording mode.

2. An ink jet printer as claimed in claim 1, wherein said ink droplet charging means is operable in a first mode for selectively charging the ink droplets in response to image information to be recorded and in a second mode for charging all the ink droplets jetting out in succession.

3. An ink jet printer as claimed in claim 1, wherein said control means causes said charging means to charge the ink droplets in said adjusting mode with half a potential for said recording mode.

4. An ink jet printer as claimed in claim 1, wherein said control means renders the electric field in the adjusting mode half of the electric field in the recording mode.

5. An ink jet printer as claimed in claim 1, wherein said adjusting means moves said ink jetting means in a direction of ink droplet deflection.

6. An ink jet printer as claimed in claim 1, wherein said adjusting means moves said ink capturing means in a direction of ink droplet deflection.

7. In an ink jet printer that can electrically charge ink droplets and project them through an electric field towards a target surface during a normal printing operation with the capacity of deflecting the charged ink droplets relative to the path of uncharged ink droplets for capturing the charged ink droplets before the target surface, the improvement comprising:

alignment means for adjusting the path of the charged ink droplets relative to the uncharged ink particles including means for varying the relative interaction of the charged ink droplets and the electric field to a lesser degree during an alignment procedure than during a printing operation.

8. An ink jet printer as claimed in claim 7, further including means for providing a constant charge to the ink droplets during an alignment procedure.

9. An ink jet printer as claimed in claim 7, wherein the means for varying the relative interaction includes means for adjusting a voltage level applied to either the ink droplet or the electric field.

10. In an ink jet printer that projects ink droplets along an axis towards an applicator position for paper, means for applying an electrical charge to selected ink droplets in accordance with image data to be printed and means for creating an electric field with the capacity of deflecting the charged ink droplets relative to the path of uncharged ink droplets, the improvement comprising:

means for physically blocking the passage of ink droplets that can be adjusted relative to the projection axis, and means for varying the relative interaction of the charged ink droplets and the electric field, during an alignment mode of operation, to provide a lesser degree of deflection of charged ink particles while the blocking means is adjusted to physically block the charged particles whereby a relatively clean alignment of the ink jet printer is accomplished.

11. An ink jet printer as claimed in claim 10, wherein the means for adjusting includes a blocking member that can be independently moved relation to the electric field for capturing ink droplets.

12. An ink jet printer as claimed in claim 10, further including means for providing a constant charge to the ink droplets during an alignment procedure.

13. An ink jet printer as claimed in claim 10, wherein the means for varying the relative interaction includes means for adjusting a voltage level applied to either the ink droplet or the electric field.

14. An ink jet printer as claimed in claim 11, further including means for detecting a charge on the blocking member.

* * * * *